UNITED STATES PATENT OFFICE.

FRANKLIN D. BORLAND AND PATRICK G. HANEY, OF McKEESPORT, PENNSYLVANIA.

COMPOSITION OF MATTER.

No. 926,463.    Specification of Letters Patent.    Patented June 29, 1909.

Application filed October 5, 1908. Serial No. 456,249.

*To all whom it may concern:*

Be it known that we, FRANKLIN D. BORLAND and PATRICK G. HANEY, citizens of the United States of America, residing at McKeesport, in the county of Allegheny and State of Pennsylvania, have invented certain new and useful Improvements in Composition of Matter, of which the following is a specification.

This invention relates to a new and useful composition of matter to be used for coating insulators and for coating steel, copper, aluminum, iron, brass, paper, wood, and similar material to make the same safe for handling when charged with electricity.

A portion of our composition consists of the following ingredients, combined in the proportions stated, viz.: linseed oil, half pint; gum arabic, two ounces; turpentine, one gill; Japan drier, half gill. These ingredients are to be thoroughly mingled by agitating and boiling for twenty minutes with a boiling heat.

After the mixture has boiled it is to be strained and then applied to the material to be coated. The insulator or article coated is then baked for six minutes in a suitable structure, and during these six minutes subjected to a heat of 250 degrees Fahr. After the article has been so dried and cooled it is ready for use.

Our coating is a non-conductor of electricity and is capable of withstanding the forces of nature when exposed to the atmosphere.

Having now described our invention what we claim as new, is:—

1. A composition for electrical insulation consisting of a heated admixture of linseed oil, gum arabic, turpentine and Japan drier in a plastic state.

2. As a new article of manufacture, an insulation medium consisting of a plastic composition derived from the boiling and straining of an admixture consisting of one-half pint linseed oil, two ounces of gum arabic, one gill turpentine, and one-half gill Japan drier.

In testimony whereof we affix our signatures in the presence of two witnesses.

FRANKLIN D. BORLAND.
PATRICK G. HANEY.

Witnesses:
H. C. EVERT,
MAX H. SROLOVITZ.